C. F. FREDE.
LOCOMOTIVE ASH PAN.
APPLICATION FILED MAY 19, 1917.
1,321,297.
Patented Nov. 11, 1919.
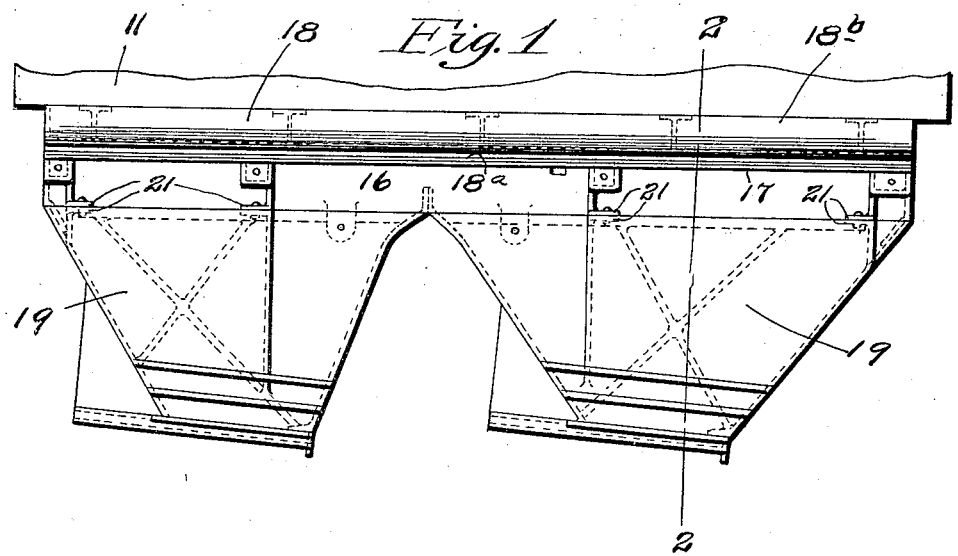
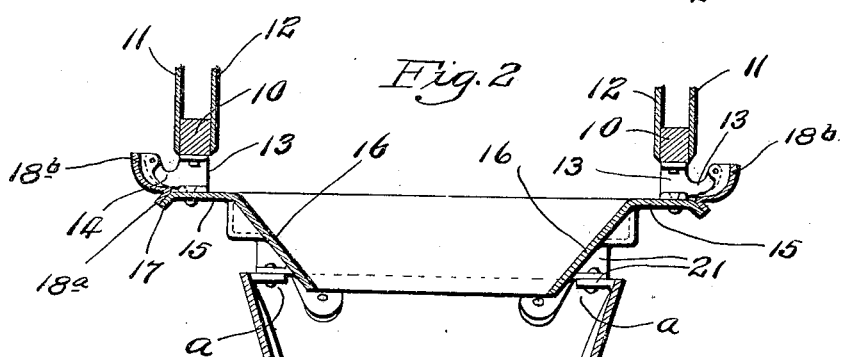
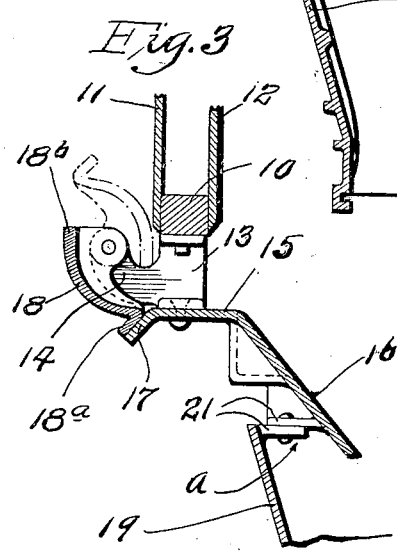
Inventor,
Charles F. Frede

UNITED STATES PATENT OFFICE.

CHARLES F. FREDE, OF ST. LOUIS, MISSOURI, ASSIGNOR TO CAST STEEL LOCOMOTIVE ASH PAN COMPANY, OF ST. LOUIS, MISSOURI, A CORPORATION OF DELAWARE.

LOCOMOTIVE ASH-PAN.

1,321,297.  Specification of Letters Patent.  Patented Nov. 11, 1919.

Application filed May 19, 1917. Serial No. 169,709.

*To all whom it may concern:*

Be it known that I, CHARLES F. FREDE, a citizen of the United States, residing at St. Louis, Missouri, have invented a certain new and useful Improvement in Locomotive Ash-Pans, of which the following is a full, clear, and exact description, such as will enable others skilled in the art to which it appertains to make and use the same, reference being had to the accompanying drawings, forming part of this specification.

My invention relates to ash pans for locomotives, one of the objects of my invention being to generally improve upon and simplify the construction of the present type of ash pans and construct the same with air inlet openings, preferably on the sides, said openings being arranged so as to effectually prevent the discharge of live ashes outwardly through said air inlet openings.

In the construction of locomotive ash pans it is common practice to provide air inlet openings in the sides of the pan and to cover these openings with reticulated material such as wire netting, thus providing for the admission of air and preventing the discharge of ashes and live coals. When such construction is employed, and the ashes accumulate up to and above the screened openings, said ashes sometimes become ignited and in time the screens are burned so as to be unfit for service, with the result that the desired protection against the discharge of live coals is lost.

My improved construction of ash pan eliminates the dangerous possibilities set forth above for I propose to provide air inlet openings in the sides of the ash pan and to arrange the walls of the pan adjacent to said openings in such a manner as to form traps which will effectually prevent the ashes from discharging through said openings even though said ashes accumulate to a plane considerably above the openings.

A further object of my invention is to arrange hinged air deflecting members between the hopper portion of the ash pan and the mud ring of the fire box, which deflecting devices are constructed so that they will retain their open and closed positions by gravity, and further, to construct and mount the deflectors so that when the same are in full open position, ample space is provided for the insertion and manipulation of a poker or slice bar for the purpose of breaking up and removing clinkers or other obstacles from the grate bars.

With the foregoing and other objects in view, my invention consists in certain novel features of construction and arrangement of parts, hereinafter more fully described and claimed, and illustrated in the accompanying drawings, in which—

Figure 1 is a side elevational view of a locomotive ash pan constructed in accordance with my invention;

Fig. 2 is an enlarged cross section taken approximately on the line 2—2 of Fig. 1;

Fig. 3 is an enlarged detail section of the upper portion of one of the side walls of the ash pan.

Referring by numerals to the accompanying drawings which illustrate a practical embodiment of my invention, 10 designates the usual mud ring of a locomotive fire box, 11 the boiler shell, and 12 the fire box sheet.

Secured in any suitable manner to the underside of the mud ring and suitably spaced apart are brackets 13, preferably of cast metal, the same being provided with outwardly projecting upwardly curved lugs 14. Fixed in any suitable manner to the lower portions of these brackets are plates 15, preferably horizontally disposed, the inner portions 16 of which are inclined downwardly and inwardly toward each other and the outer edges or portions 17 immediately beneath the lugs 14 are inclined outwardly and downwardly. These plates 15 with their inclined portions 16 constitute the upper or hopper portion of the ash pan.

In addition to serving as attaching means, the brackets 13 serve as spacers between the parts 10 and 15, and which spacers provide air inlet openings between the upper portion of the hopper and the mud ring.

Hinged in any suitable manner to each set of brackets 13 is an air deflecting plate 18, the same being curved in cross section and disposed so that when in normal position its upper edge occupies a horizontal plane substantially in or slightly above the plane occupied by the underside of the mud ring and from this point, said deflector curves downwardly and inwardly with its lower inner edge provided with a flange $18^a$ which normally bears directly against the corresponding flange 17. The upper portion $18^b$ of this curved plate is relatively thick and consequently somewhat heavier than the lower portion, and by virtue of such arrangement, said plate will by gravity maintain both its closed and open positions, and when open, as illustrated by dotted lines in Fig. 3, a horizontally disposed opening is formed between the plate and the part 15 of the hopper, which opening is ample for the admission and manipulation of a poker or slice bar.

When the plate is closed, it serves as a deflector for air entering the opening immediately beneath the mud ring, and at the same time, said deflector will tend to prevent the passage of ashes and live coals outwardly through the air inlet opening. The lower portion of the ash pan or that portion comprising the side walls 19 and end walls 20 is formed separately from the hopper or upper portion which latter as described comprises the parts 15, 16, and 17.

The upper portions of the side walls 19 are spaced apart a substantially greater distance than the distance between the lower portions of walls 16 and the upper edges of said walls 19 terminate in a horizontal plane slightly above the plane occupied by the lower edges of said walls 16.

By virtue of this arrangement, the side walls 16 of the hopper extend downwardly a short distance into the lower portion of said ash pan, thus providing vertically disposed air inlet openings $a$ between the side walls of the two parts, with the result that air is permitted to freely enter through said openings, and ashes piling up within the pan will not rise or accumulate within said inlet openings above the plane occupied by the lower edges of the walls 16. In other words, the overlapping arrangement of the walls 16 and 19 provides traps for the ashes accumulating in the pan and prevents the discharge of live ashes through the air inlet openings and which discharge is dangerous by reason of the resultant fires on the track and right-of-way. Further, by reason of the fact that the openings are vertically disposed, the rush of air entering on one side of the pan will be broken to such an extent as to prevent said air from blowing ashes out through the opening on the other side.

The lower portion of the ash pan or that portion comprising the walls 19 and 20 is connected in any suitable manner to the lower portions of the hopper walls 16, preferably by means of overlapping lugs or brackets 21.

It will thus be seen that I have provided a construction in which the several objects of the invention are attained and that said construction is comparatively simple, practical and effective for the purposes intended.

It will be readily understood that minor changes in the size, form and construction of the various parts of my improved ash pan can be made and substituted for those herein shown and described, without departing from the spirit of my invention, the scope of which is set forth in the appended claims.

I claim:

1. The combination with a locomotive fire box, of a hopper arranged beneath said fire box, there being air inlet openings formed between the side walls of the hopper and the mud ring of the fire box, air deflectors movably mounted adjacent to said air inlet openings, and an ash pan arranged beneath the hopper, the upper portions of the side walls of which ash pan are spaced apart from the lower portions of the side walls of the hopper and terminate in a plane above the lower edges of the side walls of said hopper.

2. The combination with a locomotive fire box, of a hopper arranged beneath said fire box, the upper portions of the side walls of which hopper are spaced apart from the mud ring of the fire box to form air inlet openings, hinged deflectors arranged adjacent to said air inlet openings, an ash pan positioned below the hopper, and there being vertically disposed air inlet openings formed between the lower portions of the side walls of the hopper and the upper portion of the side walls of the ash pan.

3. The combination with a locomotive fire box, of a hopper disposed beneath said fire box, there being air inlet openings formed between the upper portions of the side walls of the hopper and the mud ring of the fire box, air deflectors movably mounted adjacent to said air inlet openings, and an ash pan disposed beneath said hopper, the lower portions of the side walls of which hopper extend downwardly into the open upper end of said ash pan.

4. The combination with a locomotive fire box, of a hopper supported by and arranged beneath said fire box, the upper portions of the side walls of which hopper are spaced apart from the lower portion of the fire box, and hinged air deflectors disposed adjacent to said air inlet openings.

5. The combination with a locomotive fire box, of a hopper supported by and arranged beneath said fire box, the upper portions of the side walls of which hopper are spaced apart from the lower portion of the fire box, and hinged air deflectors disposed adjacent to said air inlet openings, the axes of which deflectors are disposed so that the latter will retain their open and closed positions by gravity.

6. The combination with a locomotive fire box, of an ash pan disposed beneath said fire box, the upper portions of the side walls of said ash pan being spaced apart from the walls of the fire box to provide air inlet openings, and hinged air deflectors disposed adjacent to said air inlet openings, which deflectors are constructed so as to maintain their open and closed positions by gravity.

7. The combination with a locomotive fire box, of an ash pan disposed beneath said fire box, spacing members arranged between the mud ring of the fire box and the upper portion of said ash pan, and air deflectors hinged to said spacing members, portions of which deflectors are weighted so that they will retain their open and closed positions by gravity.

8. The combination with a locomotive fire box, of an ash pan disposed beneath said fire box, spacing members arranged between the mud ring of the fire box and the upper portion of said ash pan, and air deflectors hinged to said spacing members, the axes of said deflectors being disposed so that the latter will retain their open and closed positions by gravity.

9. The combination with a locomotive fire box, of an ash pan disposed beneath the fire box, there being air inlet openings formed between the side walls of said ash pan and the fire box, hinged deflectors disposed adjacent to said air inlet openings, the outer upper portions of which deflectors are heavier than the inner lower portions.

In testimony whereof I hereunto affix my signature in the presence of two witnesses, this 15th day of May, 1917.

CHARLES F. FREDE.

Witnesses:
O. T. LEDFORD,
P. R. MOORE.

Copies of this patent may be obtained for five cents each, by addressing the "Commissioner of Patents, Washington, D. C."